(12) United States Patent
Friend et al.

(10) Patent No.: US 6,286,190 B1
(45) Date of Patent: Sep. 11, 2001

(54) SAFETY COUPLER

(76) Inventors: Roxane Friend; James R. Friend, both of 11555 W. Grand River Ave., Lowell, MI (US) 49331

(*) Notice: Subject to any disclaimer, the term of this patent is extended or adjusted under 35 U.S.C. 154(b) by 0 days.

(21) Appl. No.: 09/418,065

(22) Filed: Oct. 14, 1999

(51) Int. Cl.⁷ .................................................. A44B 21/00
(52) U.S. Cl. ........................ 24/265 H; 24/115 F; 24/602
(58) Field of Search ................................ 403/2; 24/602, 24/115 F, 265 H; 59/95; 119/776

(56) References Cited

U.S. PATENT DOCUMENTS

| | | | |
|---|---|---|---|
| 3,825,092 | * | 7/1974 | Graydon et al. . |
| 4,094,131 | * | 6/1978 | McElvey . |
| 4,541,364 | * | 9/1985 | Contello . |
| 4,687,365 | * | 8/1987 | Promersberger . |
| 4,733,625 | * | 3/1988 | Allen . |
| 4,742,605 | * | 5/1988 | Ritacco . |
| 4,864,696 | * | 9/1989 | Mittermaier et al. . |
| 5,027,477 | * | 7/1991 | Seron . |
| 5,174,246 | * | 12/1992 | Driver . |
| 5,475,901 | * | 12/1995 | Anscher . |
| 5,548,875 | * | 8/1996 | Hart et al. . |

* cited by examiner

Primary Examiner—James R. Brittain
(74) Attorney, Agent, or Firm—Van Dyke, Gardner, Linn & Burkhart, LLP

(57) ABSTRACT

A safety coupler includes a ring member, a hook member, and an annular member. The hook member includes a rod portion and a hook, with the rod portion including a pin and a pair of stops. The pin extends through first and second transverse openings provided in the ring member and the annular member, respectively, and rotatably couples the second member to the first member about an axis. The stops axially restrain the pin from passing through the second transverse opening. The annular member axially restrains the pin in the opening of the ring member. The pin is releasably coupled to the first member in the transverse opening such that when a force having a selected magnitude is applied to one of the ring member and the hook member along the axis, one of the stops extends through the first and second transverse openings to decouple the ring member from the hook member. In one form, the annular member comprises a resilient O-ring. Other forms include the annular member comprising a plastic material and, further, wherein the annular member breaks when the force is applied to the ring or hook member thereby releasing the ring member from the hook member.

33 Claims, 3 Drawing Sheets

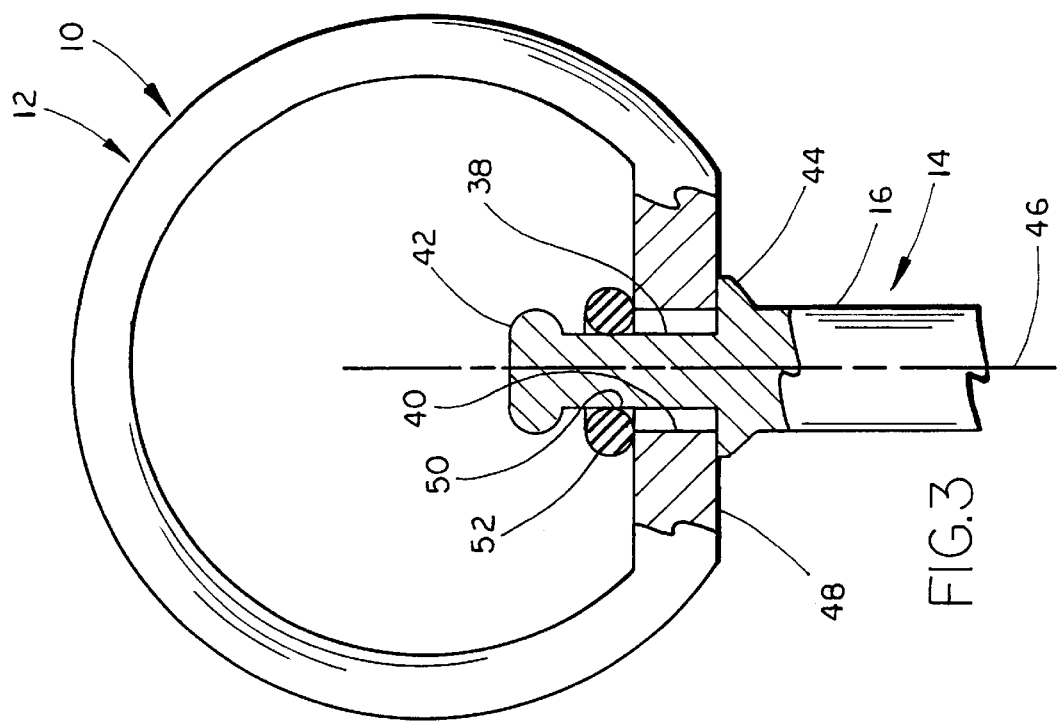
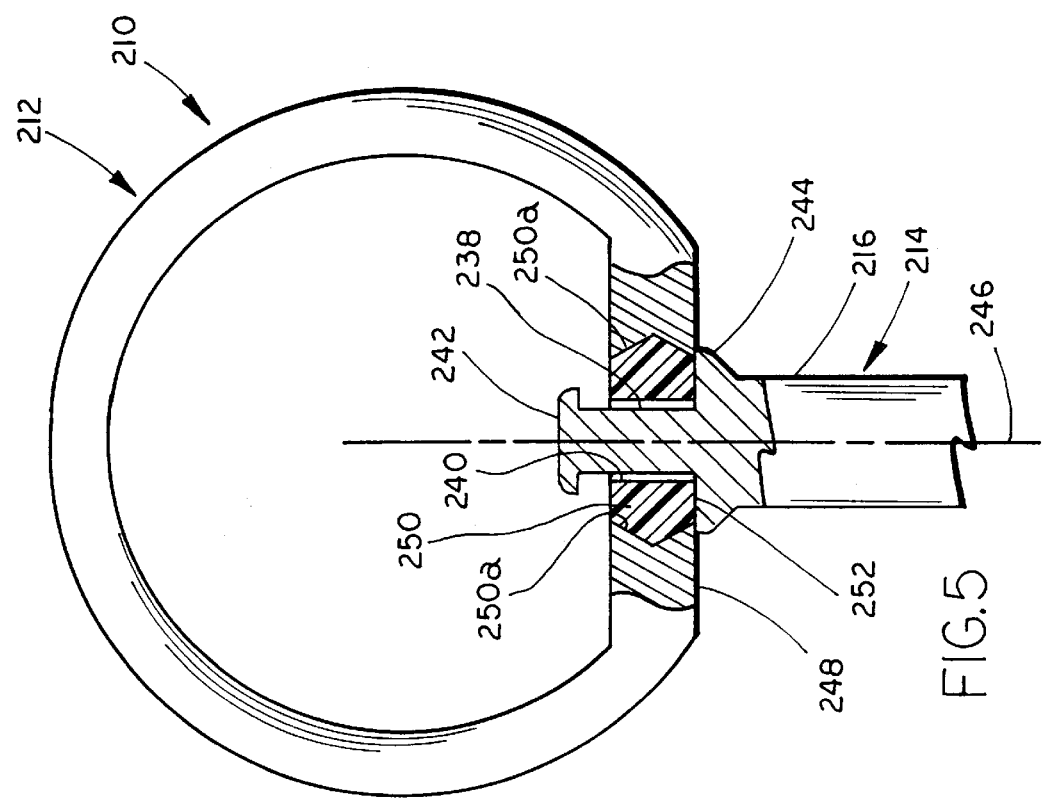

US 6,286,190 B1

SAFETY COUPLER

TECHNICAL FIELD AND BACKGROUND OF THE INVENTION

The present invention relates to a safety coupler and, more particularly to a safety coupler, which is especially suited for connecting straps or the like to an animal halter or bridle for tying the animal to a post, equipment, including a trailer, or the like.

When tying down large animals, such as a horse, the animal is typically placed in a halter with one or more ropes or straps secured to the halter on one end and secured on another end to a fixed structure, such as a post, including a barn post, a fence, a trailer, or the like. Each rope is typically secured to the halter using a coupler or snap. Snaps typically include a ring member through which the strap or rope extends and a hook member which is rotatably mounted to the ring member and which secures to the halter of the animal. The hook member is rotatably mounted to the ring member to permit the rope or strap to rotate freely with respect to the halter. Most snaps include a latch mechanism of some sort which closes the hook member on the halter. Thus, snaps provide a quick way to secure the rope or strap to the halter. Heretofore, snaps have not provided a quick way to release the strap or rope from the animal when the animal is panicked or excited.

When tied, cross-tied, or trailer tied, large animals, and most notably horses, are easily spooked. It could be as simple as someone walking by or the sound of something falling that could trigger the animal into a panic. Once spooked, these larger animals pull on the rope or strap tying them down. As the animal feels more resistance in the rope, the animal tends to pull harder eventually breaking either the halter, snap, rope, or the structure to which the rope is tied, thus exposing the animal, the structure, and any persons in the vicinity of the animal to risk of damage or injury. Further, when the animal finally breaks free the risk of flight is quite high. In contrast, when the tension on the rope is quickly released, a spooked animal will often quickly calm down and are far less likely to run off.

Consequently, there is a need for a coupler or snap which can securely couple a strap or rope to a halter of an animal or the like, so that the animal can be tied off and yet provide a quick release in the event that the animal tries to break free before the animal becomes too panicked or the halter, strap, or rope or structure is stressed to the point of failure.

SUMMARY OF THE INVENTION

Accordingly, the present invention provides a safety coupler which includes a quick release feature. In one form of the invention, a safety coupler includes a first member, which forms a closed loop for coupling to a first item, and a second member which includes a hook and is coupled to the first member. The second member is rotatably mounted to the first member in a transverse opening provided through a portion of the first member. The hook is provided for coupling to a second item whereby the first item is coupled to the second item by the safety coupler. The second member is releasably axially restrained in the transverse opening of the first member such that when a force having a selected magnitude is applied to one of the first and second members generally along the hook's axis of rotation, the second member and the second member decouple thereby decoupling the first and second items.

In one aspect, the second member includes a pin and first and second stops. The pin extends through the transverse opening of the first member with the first and second stops being positioned on opposite sides of the transverse opening for abutting the first member to limit axial movement of the pin through the first opening. The first member is adapted to permit the first stop to pass through the transverse opening when the force is applied to one of the members.

In further aspects, the pin includes an annular member positioned between the first stop and the first member. The annular member is adapted to permit the first stop to pass through the opening when the force is applied to one of the members. Preferably, the annular member comprises a resilient member which compresses when the force is applied. In another aspect, the transverse opening includes an insert, with the insert including a second opening for receiving the pin. The pin is rotatably coupled to the first member in the second opening and is axially restrained in the second opening by the first and second stops. For example, the insert may comprise a rubber or plastic insert such that when the force is applied to the first or second member, the insert releases the pin from the second opening and the second member decouples from the first member. In one form, the first stop compresses the insert and enlarges the second opening when the force is applied to one of the members thus permitting the first stop to pass through the second opening in the transverse opening of the insert and thereby releasing the second member from the first member. In other forms, the insert breaks when the force is applied to the first or second member.

These and other objects and features will become more apparent from the study of the drawings in connection with the description of the preferred embodiments which follow.

DESCRIPTION OF THE DRAWINGS

FIG. 3 is a partial fragmentary view of the connection between the hook member and the ring member of the safety coupler of FIG. 1;

FIG. 5 is a view similar to FIG. 3 of a third embodiment of the safety coupler of the present invention.

DETAILED DESCRIPTION OF THE PREFERRED EMBODIMENTS

Figure 1:
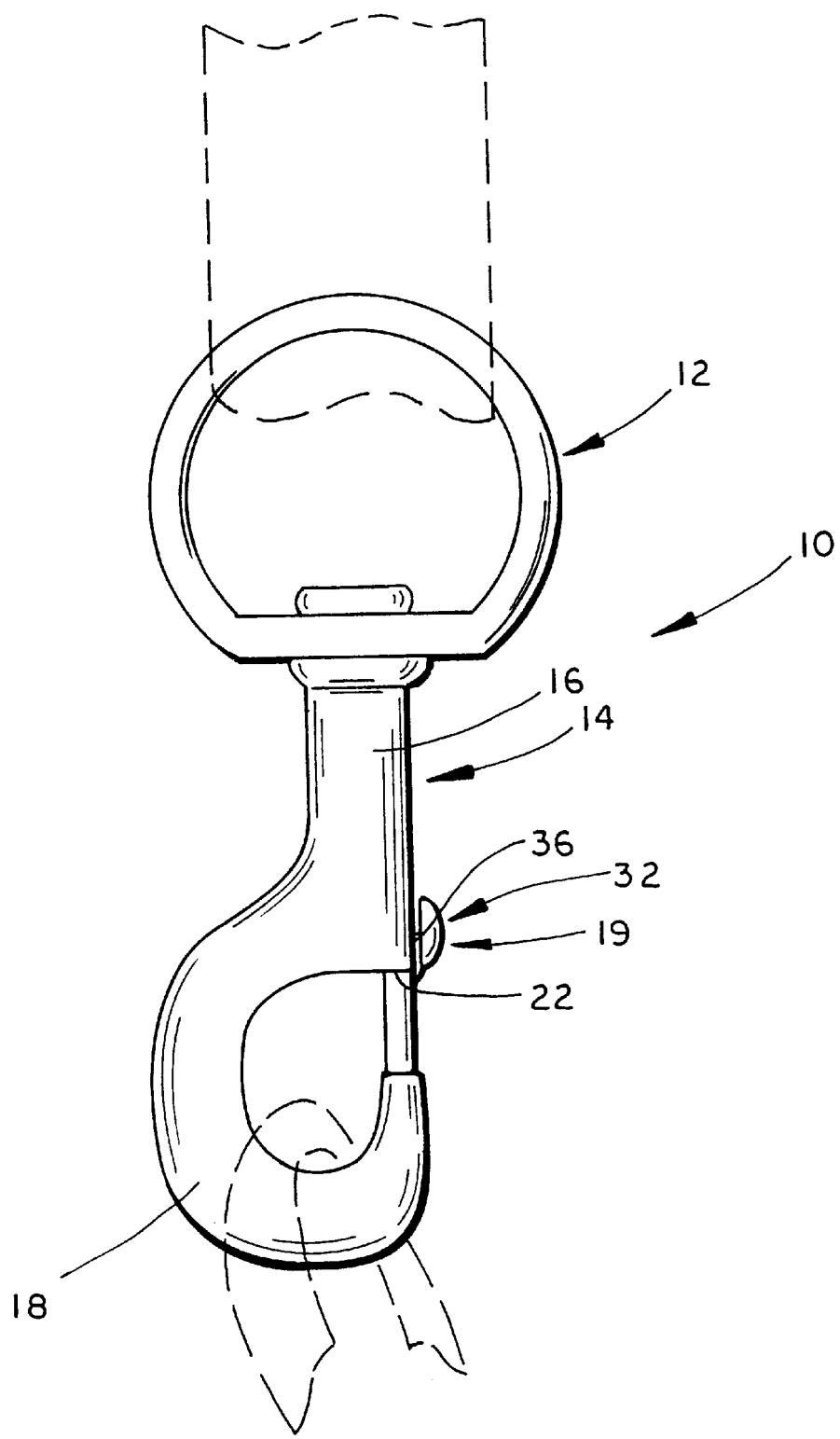
FIG. 1 illustrates a safety coupler of the present invention.
Figure 2:
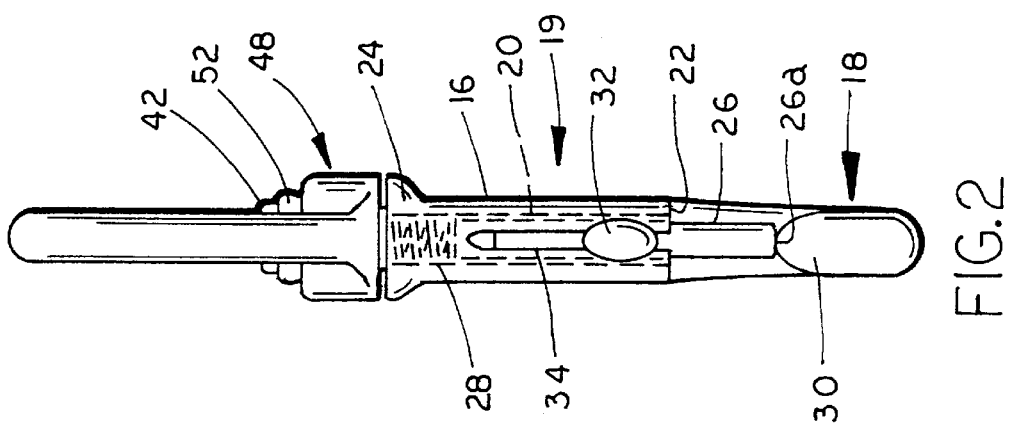
FIG. 2 is a front elevation view of a safety coupler of FIG. 1.

Referring to FIG. 1, the numeral 10 generally designates a safety coupler of the present invention. Safety coupler 10 may be used to couple a rope or strap or the like to an item, for example an animal halter or bridle. Safety coupler 10 is especially suitable for use in tying off an animal, such as a horse, a cow, an oxen, a mule, donkey or other large animals, when grooming the animal or just for securing the animal. As best seen in FIGS. 1 and 2, safety coupler 10 includes a metal ring member 12, such as a brass or stainless steel ring, and a metal hook member 14, for example, a brass or stainless steel hook, which is rotatably and releasably mounted to ring member 12, as will be more fully described below. A rope or strap may be extended through the ring member, while the hook member is used for securing the rope or strap to the halter or bridle. It should be understood that ring member 12 and hook member 14 may be formed from other durable materials, including graphite, mineral filled plastics, or the like.

In the illustrated embodiment, hook member 14 includes a rod or elongate portion 16, a C-shaped hook 18, and a closure or latch mechanism 19. Latch mechanism 19 includes a movable latch member or pin 26 and a biasing member 28, which will be more fully described below. Rod portion 16 includes a transverse longitudinal passageway 20 which extends from a lower end 22 to an upper end 24 of rod member 16. Slidably positioned in passageway 20 is latch member or pin 26. Latch pin 26 moves in passageway 20 between a closed position illustrated in FIG. 2 and an open position (not shown) in which latch pin 26 is preferably fully retracted into passageway 20. Also positioned in passageway 20 is biasing member 28, for example a coil spring, which urges latch pin 26 to its extended, closed position such that distal end 26a of latch pin 26 rests on upwardly turned portion 30 of C-shaped hook 18 thereby closing hook 18. In order to manually retract pin 26 into passageway 20 and open hook 18, pin 26 includes a gripper 32 which projects outwardly from latch pin 26 and is guided along an elongate slot 34 provided in rod portion 16, which slot 34 is in communication with passageway 20. In the illustrated embodiment, gripping member 32 comprises a bullet-shaped member which is connected to latch pin 26 by a web 36. Preferably, the width of slot 34 is commensurate in size with web 36 to limit rotation of latch pin 26 in passageway 20 but wide enough to permit web 36 to move up and down slot 34. It should be understood that hook member 14 may include a variety of latch mechanisms, including, for example a biased locking arm as would be understood by those skilled in the art.

Referring to FIG. 3, rod portion 16 includes a reduced diameter portion or pin 38 which extends through an opening 40 provided in ring member 12. Pin 38 is held in opening 40 by a first stop 42 and a second stop 44 which are respectively positioned on opposite sides of ring member 12. In the illustrated embodiment, stop 42 comprises an enlarged distal end, and stop 44 comprises a shoulder. However, it should be understood that the stops may have other forms than those illustrated in the drawings. Thus, hook member 14 is free to rotate in opening 40 about a longitudinal axis 46 and yet is restrained axially through opening 40 by enlarged end 42 and shoulder 44.

Positioned between first stop 42 and ring member 12 is an elastomeric or rubber annular member 52, for example a rubber O-ring. Annular member 52 includes a central transverse opening 50 through which pin 38 extends. Annular member 52 bears on base member 48 around opening 40. Opening 40 is sized to permit enlarged end portion 42 to pass through opening 40 when a sufficient force is applied to either ring member 12 or hook member 14 along axis 46 of such magnitude to compress annular member 52 and to enlarge opening 50. Once decoupled, ring member 12 and hook member 14 can be easily recoupled by installing a new annular member, so that coupler 10 can be used again. Thus, in addition, to providing a safety release, annular member 52 extends the life of the coupler. It should be understood from the foregoing, that annular member 52 may alternately comprise a plastic, frangible member that breaks upon the application of force. However, in this case, the coupler members can not be easily recoupled unless it is recoupled using an elastomeric annular member. In addition, the plastic material is preferably selected such that the annular member breaks without generating small chards thereby avoiding other types of injuries.

The present invention, therefore, provides a coupler with a safety release so that when the coupler is used, for example on an animal halter or bridle, and the animal panics, the tension from the connecting straps or ropes will be released from the halter so that the animal can quickly calm down. It can be understood, therefore, the selection of the material and size of annular member 52 dictates the magnitude of the force needed to decouple ring member 12 from hook member 14.

Figure 4:
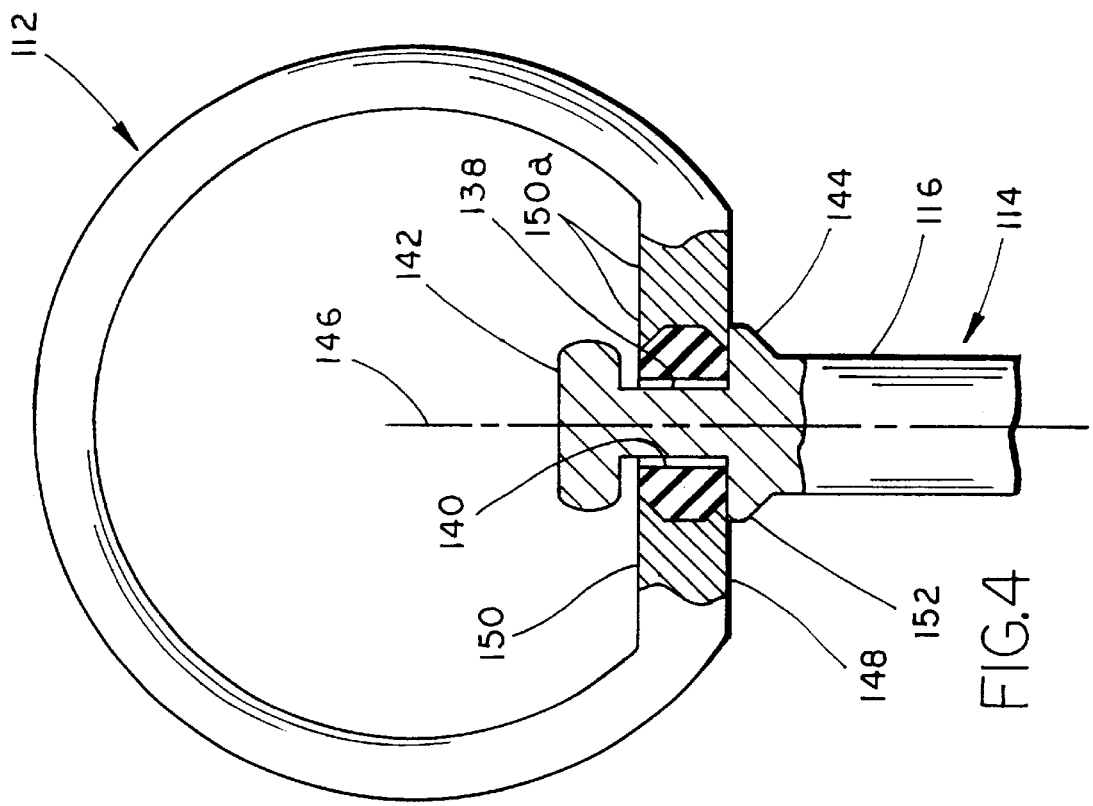
FIG. 4 is a view similar to FIG. 3 of a second embodiment of the safety coupler of the present invention.

Referring to FIG. 4, a second embodiment 110 of the safety coupler of the present invention is illustrated. Safety coupler 110 includes a ring member 112 and a hook member 114 which is rotatably and releasably mounted to ring member 112. Hook member 114 includes a rod or elongate portion 116 which includes on one end a C-shaped hook (not shown) similar to C-shaped hook 18 of the previous embodiment. Although not illustrated, hook member 114 includes a releasable latch, for example of the type disclosed in reference to the first embodiment. Rod member 116 further includes a pin 138 which extends through a transverse opening 140 of ring member 112 and is axially restrained in opening 140 by an enlarged end 142 and by a shoulder 144, which are respectively positioned on opposed sides of opening 140 on ring member 112.

Similar to the previous embodiment, ring member 112 includes an enlarged base 148 which includes a central transverse opening 150 in which an insert or annular member 152 is positioned. Insert 152 is held in transverse opening 150 by a pair of lips 150a provided on base 148. Annular member 152 also preferably comprises a pliable or rubber annular member with transverse opening 140 extending therethrough. Upon an application of sufficient force along axis 146, annular member 152 will deform to permit enlarged end 142 to extend through opening 140 to release hook member 114 from ring member 112. It should be understood that the selection of the material of insert 152 and the size of opening 140 and of enlarged end 142 dictate the magnitude of the force needed to decouple ring member 112 from hook member 114. For example, annular member 152 may comprise a natural or man made rubber. In addition, annular member 152 may comprise a frangible material such as plastic or the like and also tear or break, as described in reference to the third embodiment described below. However, preferably annular member 152 remains intact to permit reinsertion of enlarged end 142 so that coupler 110 is reusable.

Referring to FIG. 5, a third embodiment 210 of the safety coupler of the present invention is illustrated. Safety coupler 210 includes a ring member 212 and a hook member 214 which is rotatably and releasably mounted to ring member 212. Hook member 214 includes a rod portion 216 with a pin 238 which extends through an insert 252 provided in opening 250 of ring member 212. In order to axially restrain hook member 214 in opening 250, rod member 216 includes an enlarged distal end 242 and an enlarged shoulder 244 which are respectively positioned on opposite sides of ring member 212.

As previously noted, hook member 214 is free to rotate in ring member 216 and releasably mounted to ring member 212 to provide a safety release. Transverse opening 250 is at least as large as enlarged end 242 to permit enlarged end 242 to pass through opening 250, as will be further explained below. Positioned in opening 250 is insert or annular member 252 which includes a transverse opening 240. In order to retain insert 252 in opening 250, opening 250 preferably includes tapered sides or a groove 250a, which may be machined or formed in base 248. Annular member 252 preferably comprises a material which has less strength than either the hook member or ring member material, for example a non-metal pliable or frangible material, such as rubber or plastic. In the illustrated embodiment, annular member 252 comprises a plastic member which forms a frangible member. Thus, when a sufficient tension force is applied to either ring portion 212 or hook portion 214 generally along axis 246, annular member 252 being the weak link will break, thus permitting enlarged end 242 to pass through opening 250 to release hook member 214 from ring member 212. Where a pliable insert is used, as described in reference to the previous embodiment, the insert can be reinserted into opening 250 and hook member 214 reinserted into opening 240 for later reuse.

Accordingly, a safety coupler for coupling straps, ropes or the like to a halter or bridle is provided which releases upon an application of a preselected force, for example the force associated with a large animal that is trying to break free. While several forms of the invention have been shown and described, other changes and modifications will be apparent to those skilled in the art, for example, the hook member may include other latch mechanisms for closing the hook on the item to be coupled. Furthermore, the shape of the hook member and the ring member may be varied. In addition, the coupler may be used with animals other than horses, as previously noted. Also, the safety coupler of the present invention may be used in non-animal related applications and is not intended to be limited for use on halters or bridles. It should be understood that the embodiments disclosed herein are the preferred embodiments and that the scope of the patent is limited by the claims which follow.

We claim:

1. A safety coupler comprising:
    a first member comprising a closed loop member for coupling to a first item, said closed loop member having an annular portion defining a transverse opening; and
    a second member comprising a hook and a rod portion, said rod portion bearing against opposed sides of said annular portion to thereby retain said second member in said transverse opening and being rotatably mounted to said first member in said transverse opening about an axis, said hook for coupling to a second item whereby the first item couples to the second item by said safety coupler, and said second member further being releasably axially restrained in said transverse opening by said rod portion bearing against said opposed sides of said annular portion and passing through said transverse opening when a force having a selected magnitude is applied to one of said first member and said second member generally along said axis said second member and said first member decouple thereby uncoupling the first and second items.

2. The safety coupler according to claim 1, wherein said second member includes a latch for closing said hook.

3. The safety coupler according to claim 2, wherein said latch comprises a spring biased latch.

4. The safety coupler according to claim 1, wherein said rod portion includes a pair of spaced apart stops, said stops bearing against respective opposed sides of said annular portion to thereby retain said rod portion in said transverse opening.

5. The safety coupler according to claim 1, further comprising an annular ring around said rod portion, said annular ring comprising an elastomeric material, and said rod portion bearing against said annular ring to thereby bear against said annular portion, and said annular ring compressing and releasing said rod portion when said force is applied to one of said first member and said second member.

6. The safety coupler according to claim 1, wherein said annular portion includes an annular member, said annular member including a second opening, said rod portion extending through said second opening and being rotatably coupled to said first member in said second opening and being axially restrained in said second opening.

7. The safety coupler according to claim 6, wherein said rod portion includes a first stop and a second stop, said first stop bearing on said annular member on one side of said annular member, said second stop bearing against said annular portion on another side of said annular member, and said first stop enlarging said second opening when said force is applied to thereby pass through said second opening to thereby release said second member from said first member.

8. The safety coupler according to claim 7, wherein said annular member breaks when said force is applied.

9. The safety coupler according to claim 7, wherein said annular member comprises an elastomeric material, and said annular member compresses and enlarges said second opening when said force is applied.

10. A safety coupler comprising:
    a first member forming a closed loop for coupling to a first item, said first member having a transverse opening extending through a portion thereof; and
    a second member having a hook and being coupled to said first member and being rotatably mounted to said first member in said transverse opening about an axis, said hook for coupling to a second item whereby the first item couples to the second item by said safety coupler, said second member including a pin and first and second stops, said pin extending through said transverse opening, and said first and second stops being positioned on opposite sides of said transverse opening for abutting said first member to limit axial movement of said pin through said first opening, said second member further being releasably axially restrained in said transverse opening such that when a force having a selected magnitude is applied to one of said first member and said second member generally along said axis said second member and said first member decouple thereby uncoupling the first and second items, and said first member being adapted to permit one of said first and second stops to pass through said opening when said force is applied to one of said first member and said second member.

11. The safety coupler according to claim 10, wherein said first member comprises a ring member.

12. The safety coupler according to claim 10, wherein said pin includes an enlarged distal end defining said first stop.

13. The safety coupler according to claim 12, wherein said second stop comprises a shoulder formed in said second member.

14. The safety coupler according to claims 10, wherein said transverse opening includes an insert, said insert including a second opening extending therethrough for receiving said pin, said pin being rotatably coupled to said first member in said second opening and being axially restrained in said second opening by said first and second stops, said insert comprising one of a plastic insert and a rubber insert such that when said force is applied to said one of said first member and said second member said insert releases said pin from said second opening and said second member decouples from said first member.

15. The safety coupler according to claim 14, wherein said insert breaks when said force is applied to said one of said first member and said second member thereby releasing second member from said first member.

16. The safety coupler according to claim 15, wherein said insert comprises a plastic material.

17. The safety coupler according to claim 14, wherein said insert comprises a rubber material.

18. The safety coupler according to claim 17, wherein said second member compresses said insert and enlarges said second opening when said force is applied to one of said first member and said second member thus permitting one of said first and second stops to pass through said second opening and said transverse opening thereby releasing second member from said first member.

19. safety coupler comprising:

a first member forming a closed loop for coupling to a first item, said first member having a transverse opening extending through a portion thereof; and a second member having a rod portion and a hook portion, said rod portion including a pin and a pair of stops, said pin extending through said transverse opening and rotatably coupling said second member to said first member about an axis, said stops axially restraining said pin in said transverse opening, said hook for coupling to a second item whereby the first item is coupled to the second item by said safety coupler, said pin being releasably coupled to said first member in said transverse opening such that when a force having a selected magnitude is applied to one of said first member and said second member generally along said axis one of said stops extends through said transverse opening and said second member and said first member decouple thereby uncoupling the first and second items.

20. The safety coupler according to claim 19, further comprising an annular member interposed between at least one of said first and second stops and said first member, said one of said first and second stops bearing on said annular member to axially restrain said pin in said transverse opening, and said annular member being adapted to permit said one of said first and second stops to pass through said transverse opening when a force having a selected magnitude is applied to one of said first and second members generally along said axis.

21. The safety coupler according to claim 20, wherein said annular member comprises an insert, said insert including a second opening extending therethrough for receiving said pin, said pin being rotatably coupled to said first member in said second opening and being axially restrained in said second opening by said first and second stops, said insert comprising one of a plastic insert and a rubber insert such that when said force is applied to said one of said first member and said second member said insert releases said pin from said second opening and second member decouples from said first member.

22. The safety coupler according to claim 21, wherein said annular member comprises a rubber material.

23. The safety coupler according to claim 22, wherein said one of said first and second stops compresses said annular member and enlarges said second opening passes through said second opening when said force is applied to one of said first member thereby releasing second member from said first member.

24. The safety coupler according to claim 20, wherein said annular member breaks when said force is applied to said one of said first member and said second member thereby releasing second member from said first member.

25. The safety coupler according to claim 24, wherein said insert comprises a plastic material.

26. The safety coupler according to claim 19 wherein said second member includes a latch for closing said hook.

27. The safety coupler according to claim 26, wherein said latch comprises a spring biased latch.

28. A safety coupler comprising:

a ring member for coupling to a first item, said ring member having a first transverse opening extending through a portion thereof;

a hook member having a rod portion and a hook, said rod portion including a pin and a pair of stops; and an annular member having a second transverse opening, said pin extending through said first and second transverse openings and rotatably coupling said hook member to said ring member about an axis, said stops axially restraining said pin in said second transverse opening, said annular member axially restraining said pin in said first transverse opening, said hook for coupling to a second item whereby the first item is coupled to the second item by said safety coupler, said pin being releasably coupled to said ring member in said first and second transverse openings such that when a force having a selected magnitude is applied to one of said ring member and said hook member generally along said axis one of said stops extends through said first and second transverse openings and said hook member and said ring member decouple thereby uncoupling the first and second items.

29. The safety coupler according to claim 28, wherein said annular member is interposed between one of said first and second stops and said ring member, said one of said first and second stops bearing on said annular member to axially restrain said pin in said second transverse opening, and said annular member being adapted to permit said one of said first and second stops to pass through said transverse opening when a force having a selected magnitude is applied to one of said ring member and said hook member generally along said axis.

30. The safety coupler according to claim 29, wherein said annular member breaks when said force is applied to said one of said ring member and said hook member thereby releasing said hook member from said ring member.

31. The safety coupler according to claim 30, wherein said annular member comprises a plastic material.

32. The safety coupler according to claim 28, wherein said annular member comprises an insert, said insert being positioned in said first opening.

33. The safety coupler according to claim 32, wherein said annular member comprises a rubber material.

* * * * *